(12) United States Patent
Muramatsu (10) Patent No.: US 9,019,406 B2
(45) Date of Patent: Apr. 28, 2015

(54) IMAGING APPARATUS AND IMAGE PROCESSING PROGRAM FOR CORRECTING DARK AREA GRADATION

(75) Inventor: Masaru Muramatsu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 711 days.

(21) Appl. No.: 12/153,136

(22) Filed: May 14, 2008

(65) Prior Publication Data

US 2008/0297632 A1    Dec. 4, 2008

(30) Foreign Application Priority Data

Jun. 1, 2007    (JP) ................. 2007-147327

(51) Int. Cl.
H04N 5/202    (2006.01)
H04N 9/64    (2006.01)
H04N 9/083    (2006.01)
H04N 5/243    (2006.01)
H04N 101/00    (2006.01)

(52) U.S. Cl.
CPC ............... *H04N 5/202* (2013.01); *H04N 5/243* (2013.01); *H04N 2101/00* (2013.01)

(58) Field of Classification Search
USPC .................................. 348/254, 243, 251, 274
See application file for complete search history.

(56) References Cited

U.S. PATENT DOCUMENTS

| | | | |
|---|---|---|---|
| 5,454,044 A | 9/1995 | Nakajima | |
| 5,517,333 A * | 5/1996 | Tamura et al. | 358/518 |
| 5,608,813 A | 3/1997 | Nakajima | |
| 7,088,390 B2 | 8/2006 | Mori et al. | |
| 7,791,656 B2 * | 9/2010 | Katagiri et al. | 348/254 |
| 2002/0034336 A1 * | 3/2002 | Shiota et al. | 382/274 |
| 2002/0106123 A1 * | 8/2002 | Inoue | 382/168 |
| 2004/0207736 A1 * | 10/2004 | Muramatsu | 348/254 |

(Continued)

FOREIGN PATENT DOCUMENTS

| | | |
|---|---|---|
| EP | 0 813 336 A2 | 12/1997 |
| JP | B-2663189 | 10/1997 |

(Continued)

OTHER PUBLICATIONS

Dec. 29, 2011 European Search Report issued in European Patent Application No. 08251879.6.
Oct. 18, 2011 Office Action issued in Japanese Patent Application No. 2007-147327 (with translation).

*Primary Examiner* — Joel Fosselman
(74) *Attorney, Agent, or Firm* — Oliff PLC (57) ABSTRACT

An imaging apparatus includes an image pickup unit generating image data, a selecting unit selecting any one of a first photographic mode that does not correct dark area gradation of the image data and a second photographic mode that corrects the dark area gradation of the image data, a gradation conversion processing unit performing a gradation conversion processing according to a first input-output characteristic when the first photographic mode is selected, and performing a gradation conversion processing according to a second input-output characteristic different from the first input-output characteristic when the second photographic mode is selected, and a correcting unit performing a correction of improving lightness of the dark area gradation of the image data when the second photographic mode is selected. Therefore, when correction of the dark area gradation is performed, the lightness of the whole image can be maintained while the contrast of a highlight area is improved.

15 Claims, 6 Drawing Sheets

(56) References Cited

U.S. PATENT DOCUMENTS

| | | |
|---|---|---|
| 2006/0055991 A1 | 3/2006 | Minakuti et al. |
| 2006/0061842 A1 | 3/2006 | Oka et al. |
| 2006/0221216 A1 | 10/2006 | Hattori |
| 2007/0013782 A1* | 1/2007 | Kobayashi ............... 348/207.99 |
| 2007/0040914 A1 | 2/2007 | Katagiri et al. |
| 2007/0081721 A1 | 4/2007 | Xiao et al. |

FOREIGN PATENT DOCUMENTS

| | | |
|---|---|---|
| JP | A-2006-93753 | 4/2006 |
| JP | A-2006-287323 | 10/2006 |
| JP | A-2007-67907 | 3/2007 |

* cited by examiner

IMAGING APPARATUS AND IMAGE PROCESSING PROGRAM FOR CORRECTING DARK AREA GRADATION

CROSS-REFERENCE TO RELATED APPLICATION

This application is based upon and claims the benefit of priority from Japanese Patent Application No. 2007-147327, filed on Jun. 1, 2007, the entire contents of which are incorporated herein by reference.

BACKGROUND

1. Field

The present invention relates to an imaging apparatus and an image processing program.

2. Description of the Related Art

Conventionally, there has been known a phenomenon that dark area gradation of image data is blacked out by shooting a subject having large difference in brightness. Therefore, in inventions of Patent Document 1, the gradation is compressed by increasing the gain of the dark area gradation, and thereby the black-out of the dark area gradation is improved (for example, Japanese Patent No. 2,663,189).

However, in the aforementioned inventions of Patent Document 1, as the gradation of an image is compressed, the impression of the whole image will also be lighter. As a result, there was a problem in that the impression of lightness differs between an image subjected to a gradation compression processing and an image not subjected to the gradation compression processing, thus providing odd feeling to a user. Moreover, on the contrary of the aforementioned black-out of the dark area gradation, although a technology for improving the white washout of a highlight area by way of gradation compression has been considered, there was a problem in that suppression of the white washout reduces the contrast of the highlight area.

SUMMARY

A proposition of an imaging apparatus and an image processing program of the present invention is to maintain lightness of a whole image, while improving contrast of a highlight area, at the time of correcting dark area gradation.

In order to achieve the above-mentioned proposition, the imaging apparatus of the present invention, includes an image pickup unit picking up a subject image and generating image data, a selecting unit selecting any one of a first photographic mode that does not correct dark area gradation of the image data and a second photographic mode that corrects the dark area gradation of the image data, a gradation conversion processing unit performing a gradation conversion processing according to a first input-output characteristic when the first photographic mode is selected, and performing a gradation conversion processing according to a second input-output characteristic different from the first input-output characteristic when the second photographic mode is selected, and a correcting unit performing a correction of improving lightness of the dark area gradation of the image data subjected to the gradation conversion processing according to the second input-output characteristic by the gradation conversion processing unit when the second photographic mode is selected.

In addition, preferably, in a dark area of gradation, the second input-output characteristic may have a characteristic realizing an output level which is lower than the output level of the first input-output characteristic, with respect to the same input level.

Moreover, preferably, in the dark area of gradation, the second input-output characteristic may be defined by a gradation curve having a gradient smaller than that of the first input-output characteristic.

Moreover, preferably, in a light area of gradation, the second input-output characteristic may have a characteristic emphasizing contrast more than the first input-output characteristic.

Moreover, preferably, in the light area of gradation, the second input-output characteristic may be defined by a gradation curve having a gradient larger than that of the first input-output characteristic.

Moreover, the imaging apparatus may further include an obtaining unit obtaining a lightness improvement amount of the dark area gradation by the correcting unit, wherein the gradation conversion processing unit selects any characteristic from among a plurality of predetermined input-output characteristics as the second input-output characteristic according to the lightness improvement amount, and performs the gradation conversion processing according to the selected input-output characteristic, and the correcting unit corrects the dark area gradation of the image data according to the lightness improvement amount.

Moreover, the imaging apparatus may further include an obtaining unit obtaining a lightness improvement amount of dark area gradation by the correcting unit, wherein the gradation conversion processing unit determines the second input-output characteristic according to the lightness improvement amount, and performs the gradation conversion processing according to the determined input-output characteristic, and the correcting unit corrects the dark area gradation of the image data according to the lightness improvement amount.

Moreover, an image processing program for causing a computer to realize an image processing with respect to the image data to be processed, in which the configuration regarding the above invention is expressed by converting the configuration into the program, is also effective as a specific embodiment of the present invention.

DETAILED DESCRIPTION OF THE EMBODIMENTS

Hereinafter, with reference to drawings, an embodiment of the present invention will be described. In the following embodiment, a single lens reflex type electronic camera will be described as an example.

Figure 1:
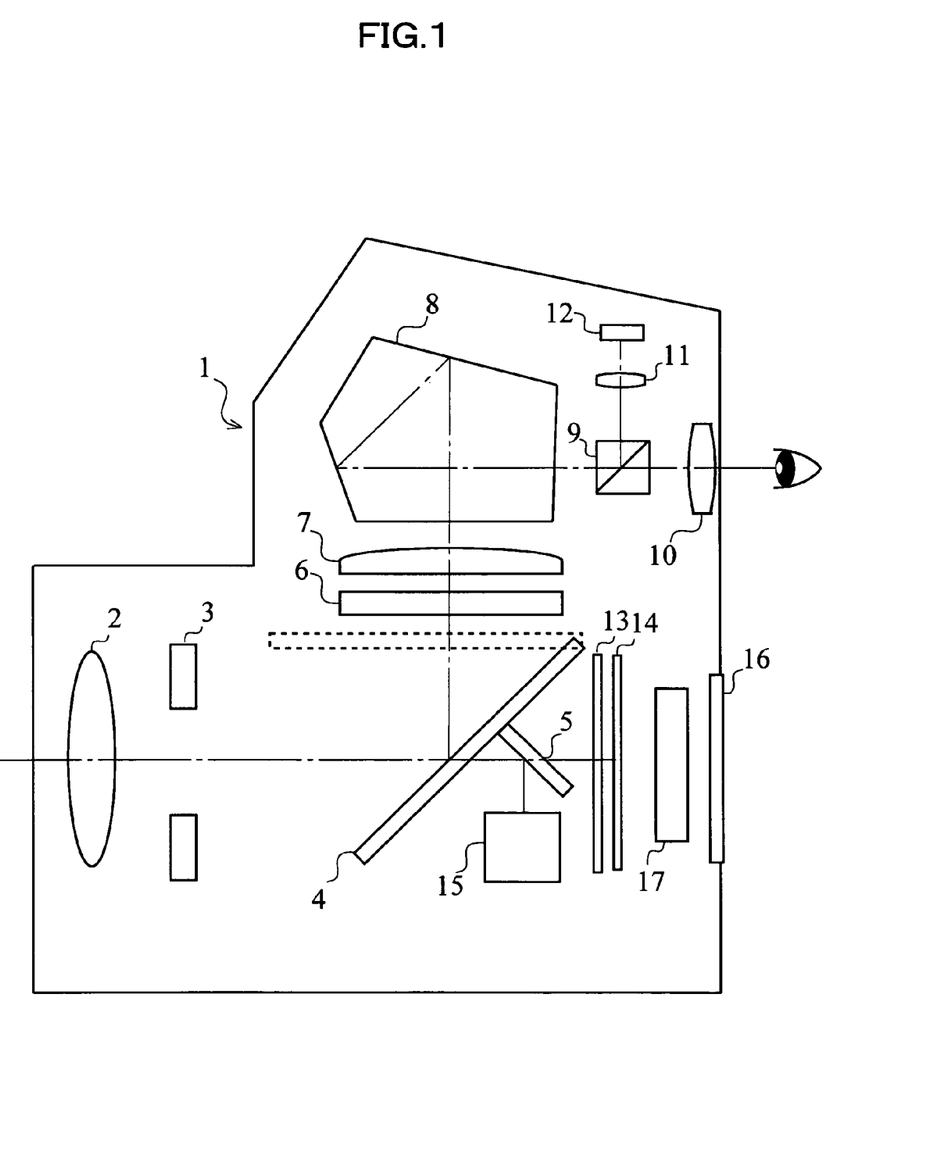
FIG. 1 is a view showing a configuration of an electronic camera 1 in accordance with the present embodiment.

FIG. 1 is a figure showing a configuration of an electronic camera 1 of the present embodiment. As shown in FIG. 1, the electronic camera 1 includes the following parts a photographic lens 2, an aperture diaphragm 3, a quick return mirror 4, a sub mirror 5, a diffusion screen 6, a condenser lens 7, a pentaprism 8, a beam splitter 9, an ocular lens 10, an imaging lens 11, an AE sensor 12, a shutter 13, an image-capturing sensor 14, and a focus detecting part 15.

The AE sensor 12 is, for example, a 5-way split photometric sensor. The image-capturing sensor 14 is a semiconductor device, such as a CCD (Charge Coupled Device), or a CMOS (Complementary Metal Oxide Semiconductor). The focus detecting part 15 performs focus detection in a scheme of, for example, phase difference to detect the focused state of the photographic lens 2. Moreover, the electronic camera 1 performs focus detection in a contrast scheme based on the brightness detected by the AE sensor 12, to detect the focused state of the photographic lens 2. It is preferable that whether the focus detection in a phase difference scheme or the focus detection in a contrast scheme should be performed can be set depending on operation of a user. Moreover, a configuration in which the focused state of the photographic lens 2 is detected by the combination of the focus detection in a phase difference scheme or the focus detection in a contrast scheme, may also be used.

Moreover, the electronic camera 1 further includes a monitor 16 such as a liquid crystal display monitor displaying an image etc. generated by way of image pick-up, and a controlling part 17 that controls each of the parts. The controlling part 17 includes a not-shown memory inside thereof, and preliminarily records programs for controlling each of the parts.

At the time of non shooting, that is when shooting is not performed, as shown in FIG. 1, the quick return mirror 4 is arranged at an angle of 45°. Light flux which passed through the photographic lens 2 and the aperture diaphragm 3, is then reflected by the quick return mirror 4 to be led to the ocular lens 10 through the diffusion screen 6, the condenser lens 7, the pentaprism 8, and the beam splitter 9. A user confirms a construct by viewing the subject image through the ocular lens 10. On the other hand, light flux which is divided upward by the beam splitter 9, is re-imaged on the image pick-up plane of the AE sensor 12 through the imaging lens 11. Moreover, light flux which passed through the quick return mirror 4, is led to the focus detecting part 15 through the sub mirror 5.

On the other hand, at the time of shooting, the quick return mirror 4 is evacuated to a position shown by a dashed line to open the shutter 13, and the light flux from the photographic lens 2 is led to the image-capturing sensor 14.

Figure 2:
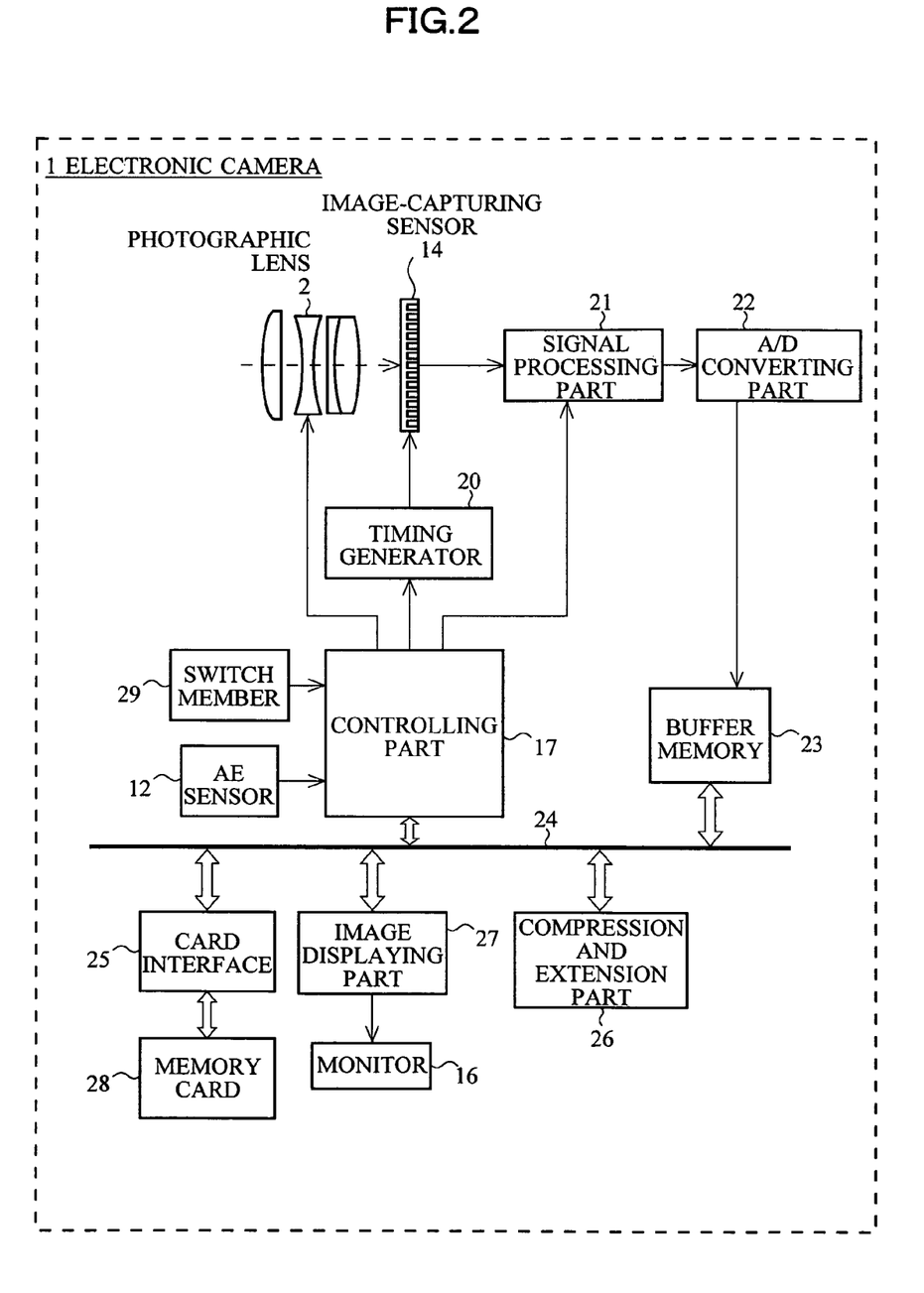
FIG. 2 is a functional block diagram of the electronic camera 1 in accordance with the present embodiment.

FIG. 2 is a functional block diagram of the electronic camera 1 of the present embodiment. As shown in FIG. 2, in addition to the configuration in FIG. 1, the electronic camera 1 includes the following parts: a timing generator 20, a signal processing part 21, an A/D converting part 22, a buffer memory 23, a bus 24, a card interface 25, a compression and extension part 26, and an image displaying part 27. The timing generator 20 supplies an output pulse to the image-capturing sensor 14. Moreover, the image data generated by the image-capturing sensor 14 is temporarily stored on the buffer memory 23 through the signal processing part 21 (an adjusting part of gain corresponding to image pick-up sensitivity is included), and the A/D converting part 22. The buffer memory 23 is coupled to the bus 24. The card interface 25, the controlling part 17 described in FIG. 1, the compression and extension part 26, and the image displaying part 27 are coupled to the bus 24. The card interface 25 is coupled to a detachable memory card 28 and records image data on the memory card 28. Moreover, switch members 29 (not-shown release buttons and the like are included) of the electronic camera 1, the timing generator 20, and the AE sensor 12 are coupled to the controlling part 17. Further, the image displaying part 27 displays an image or the like on the monitor 16 disposed on the back surface of the electronic camera 1.

Moreover, the electronic camera 1 includes a gradation non-compression mode in which the dark area gradation of image data is not corrected and a gradation compression mode in which the dark area gradation of image data is corrected. In which mode shooting is performed, is selected in advance by a user through the switch members 29. Moreover, in the gradation compression mode, the magnitude of gradation compression amount (lightness improvement amount) can be set into two stages (large/small). The setting is also performed in advance by the user through the switch members 29.

Figure 3:
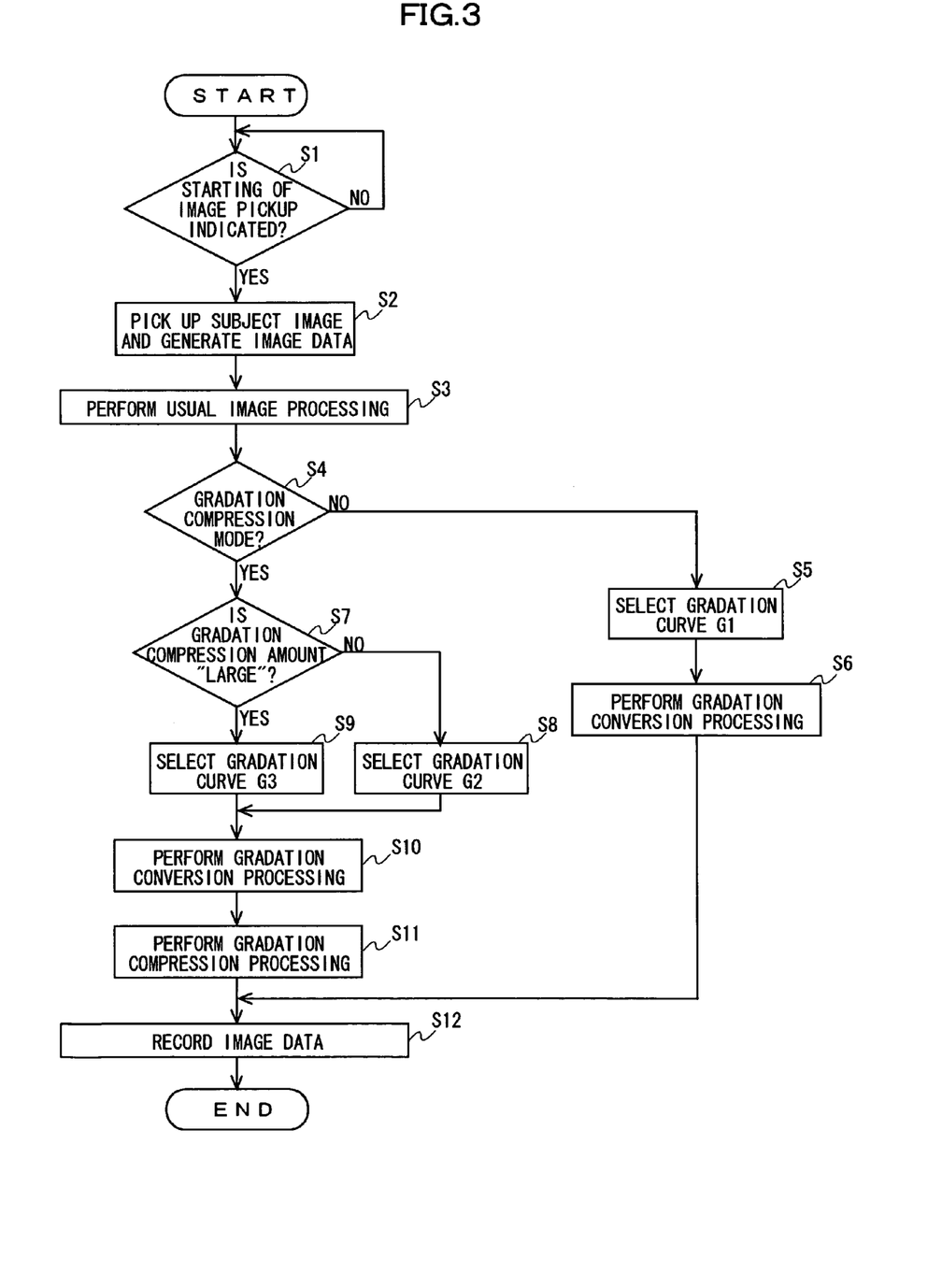
FIG. 3 is a flow chart showing operation at the time of shooting of the electronic camera 1 in accordance with the present embodiment.

The operation at the time of shooting of the electronic camera 1 having a configuration mentioned above will be described with reference to a flow chart shown in FIG. 3.

At Step S1, the controlling part 17 determines whether or not start of shooting is indicated by the user through the switch members 29. Then, if the controlling part 17 determines that the start of shooting is indicated, the controlling part 17 will proceed to Step S2.

At Step S2, the controlling part 17 controls each of the parts, and picks up a subject image by the image-capturing sensor 14 and generate image data. The image data generated by the image-capturing sensor 14 is temporarily memorized on the buffer memory 23 through the signal processing part 21 and the A/D converting part 22.

At Step S3, the controlling part 17 reads out the image data from the buffer memory 23, and performs usual image processing. The usual image processing is a process, such as white balance adjustment, interpolation processing, or color tone correction processing. Since the specific method of each processing is the same as that of a known technology, description thereof will be omitted.

At Step S4, the controlling part 17 determines whether or not the gradation compression mode is selected. Then, if the controlling part 17 determines that the gradation compression mode is selected, the controlling part 17 will proceed to Step S6. On the contrary, if the controlling part 17 determines that the gradation compression mode is not selected (gradation non-compression mode is selected), the controlling part 17 will proceed to Step S5.

At Step S5, the controlling part 17 selects the gradation curve G1. The gradation curve is used for gradation conversion processing performed at below mentioned Step S6 or Step S10. The controlling part 17 records three kinds of gradation curves (G1 to G3) shown in FIG. 4 on a not-shown internal memory in advance.

Figure 4:
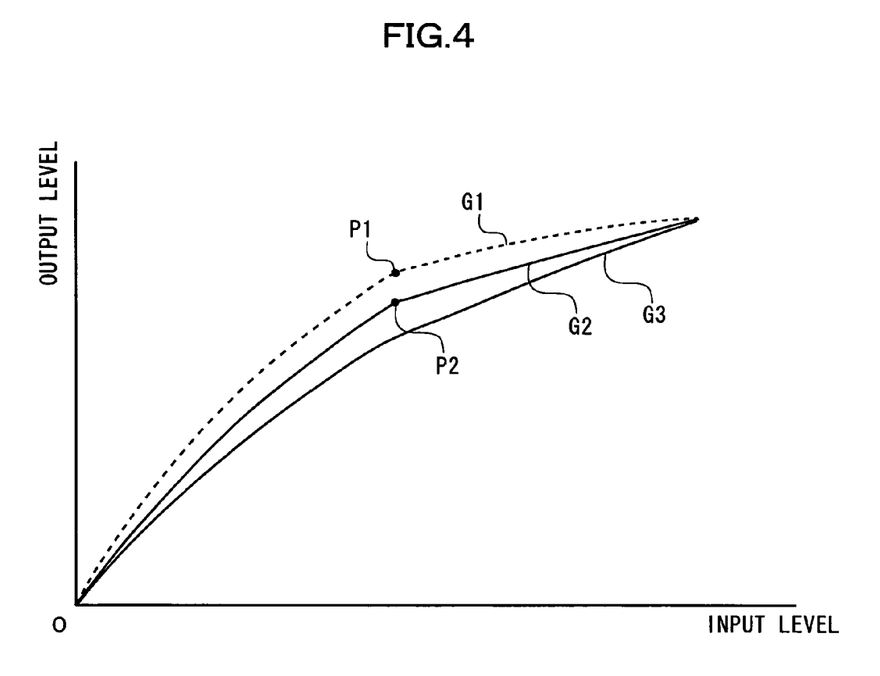
FIG. 4 is a view illustrating a gradation curve.

In the gradation non-compression mode, the controlling part 17 selects the gradation curve G1 shown in FIG. 4. The gradation curve is the one used for a usual gradation conversion processing as same as that of a known technology. However, as shown in FIG. 4, the gradation curve G1 has a gamma characteristic at a dark area side than a point P1, and a knee characteristic at a light area side than the point P1. Regarding the knee characteristic, it is the same as that of the Japanese Unexamined Patent Application Publication No. 2006-287323 which is already applied by the present applicant. The knee characteristic of the gradation curve G1 enables the white washout of the light area (highlight area) to be suppressed.

At Step S6, according to the gradation curve G1 selected at Step S5, the controlling part 17 performs a gradation conversion processing on the image data which is subjected to the image processing at Step S3. Since the details of the gradation conversion processing are the same as those of a known technology, description thereof will be omitted. Then the controlling part 17 will proceed to Step S12 described later.

At Step S7, the controlling part 17 determines whether or not the gradation compression amount is "large". If the controlling part 17 determines that the gradation compression amount is "large", the controlling part 17 will proceed to Step S9 described later. On the contrary, if the controlling part 17 determines that the gradation compression amount is not "large" (the gradation compression amount is "small"), the controlling part 17 will proceed to Step S8.

At Step S8, the controlling part 17 selects a gradation curve G2. As shown in FIG. 4, the gradation curve G2 has the gamma characteristic in a dark area side than a point P2, and has the knee characteristic in a light area side than the point P2. However, in the dark area of gradation, the gradation curve G2 has a characteristic realizing a lower output level than that of the above mentioned gradation curve G1, with respect to an input level. Therefore, in the dark area of gradation, the gradation curve G2 has a gradient smaller than that of the gradation curve G1. Moreover, in the light area of gradation, the gradation curve G2 has a characteristic emphasizing contrast more than the gradation curve G1. Therefore, in the light area of gradation, the gradation curve G2 has a gradient larger than that of the gradation curve G1.

At Step S9, the controlling part 17 selects a gradation curve G3. As shown in FIG. 4, the gradation curve G3 has a characteristic having a gamma characteristic in the dark area side and a knee characteristic in the light area side continuously. However, in the dark area of gradation, the gradation curve G3 has a characteristic realizing a lower output level than the above mentioned gradation curve G2, with respect to an input level. Therefore, in the dark area of gradation, the gradation curve G3 has a gradient smaller than those of the gradation curves G1 and G2. Moreover, in the light area of gradation, the gradation curve G3 has a characteristic emphasizing contrast more than the gradation curves G1 and G2. Therefore, in the light area of gradation, the gradation curve G3 has a gradient larger than those of the gradation curves G1 and G2.

At Step S10, according to the gradation curve G2 selected at Step S8 or the gradation curve G3 selected at Step S9, the controlling part 17 performs a gradation conversion processing on the image data which is subjected to the imaging processing at Step S3. Since the details of the gradation conversion processing are the same as those of a known technology, description thereof will be omitted. Then the controlling part 17 will proceed to Step S11 described later.

In the gradation conversion processing at Step S10, as shown in FIG. 4, the gradation curve G2 or G3 is used, of which gradation is smaller than that of the usual gradation curve G1 in the dark area of gradation, and of which gradation is larger than that of the gradation curve G1 in the light area of gradation. As a result, a gradation conversion processing will be performed, which is relatively darker as a whole than the usual gradation conversion processing performed according to the usual gradation curve G1. Moreover, it is possible to improve the contrast in the highlight area while suppressing the white washout thereof.

At Step S11, the controlling part 17 performs a gradation compression processing on the image data which is subjected to the gradation conversion processing at Step S10.

Figure 5:
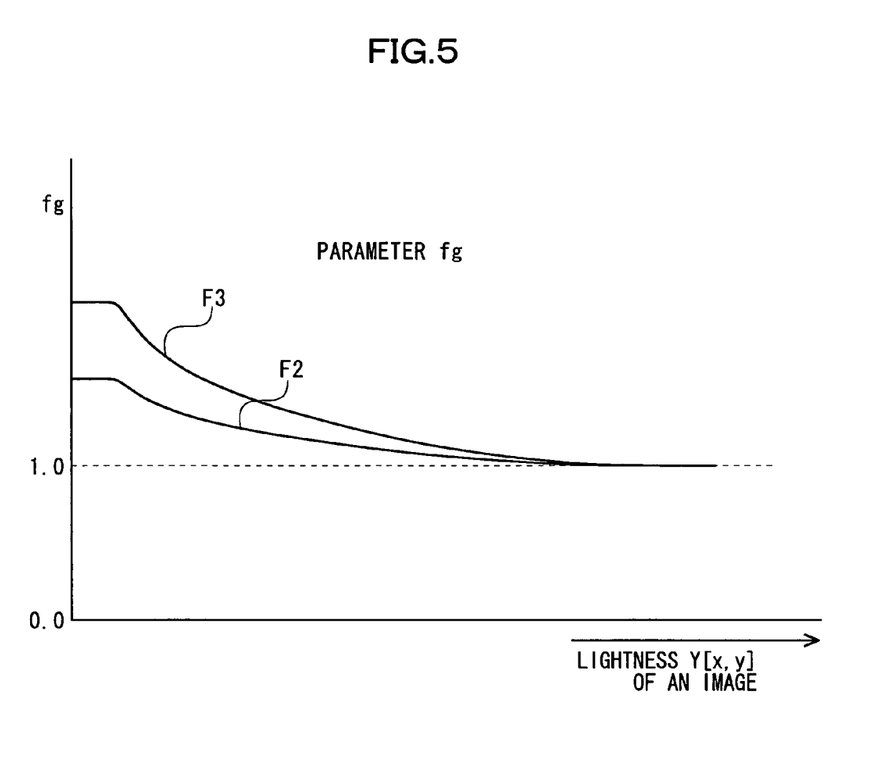
FIG. 5 is a view illustrating a parameter fg of gradation compression.

FIG. 5 is a view showing a parameter fg of gradation compression. As shown in FIG. 5, the parameter fg has a gain depending on the lightness Y of an image, and as the lightness Y becomes smaller (as the neighboring range containing the image to be processed becomes darker), the parameter fg becomes larger. On the contrary, as the lightness Y becomes larger (as the neighboring range containing the image to be processed becomes lighter), the parameter fg becomes closer to 1. In addition, F2 in FIG. 5 indicates the parameter fg when the magnitude of the gradation compression amount is "small", and F3 indicates the parameter fg when the magnitude of the gradation compression amount is "large." That is, at Step S10, when the gradation conversion processing is performed according to the gradation curve G2, the gradation conversion processing is performed using the parameter fg indicated by F2 in FIG. 5. Moreover, at Step S10, when the gradation conversion processing is performed according to the gradation curve G3, the gradation conversion processing is performed using the parameter fg indicated by F3 in FIG. 5.

Gradation compression operations of each of pixels R[x, y], G[x, y] and B[x, y] are performed by the following Formula (1) to Formula (4).

$$Y[x, y] = kr \cdot R[x, y] + kg \cdot G[x, y] + kb \cdot B[x, y] \quad \text{Formula (1)}$$

$$Rc[x, y] = \quad \text{Formula (2)}$$
$$R[x, y] \cdot fg \left\{ \sum_{i=-d}^{d} \sum_{j=-d}^{d} \left( Y[x+i, y+j] \cdot Lpw[(i^2 + j^2)^{1/2}] \right) \right\}$$

$$Gc[x, y] = \quad \text{Formula (3)}$$
$$G[x, y] \cdot fg \left\{ \sum_{i=-d}^{d} \sum_{j=-d}^{d} \left( Y[x+i, y+j] \cdot Lpw[(i^2 + j^2)^{1/2}] \right) \right\}$$

$$Bc[x, y] = \quad \text{Formula (4)}$$
$$B[x, y] \cdot fg \left\{ \sum_{i=-d}^{d} \sum_{j=-d}^{d} \left( Y[x+i, y+j] \cdot Lpw[(i^2 + j^2)^{1/2}] \right) \right\}$$

Figure 6:
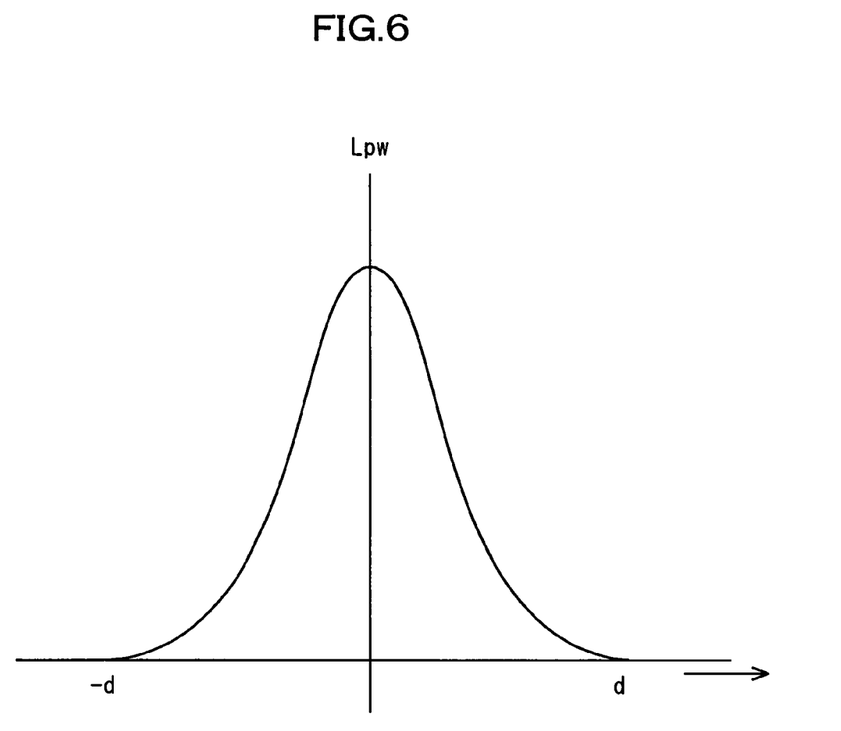
FIG. 6 is a view illustrating a low-pass filter.

Where, Y in Formula (1) to Formula (4) indicates the brightness value of a pixel to be noted. Moreover, kr, kg and kb in Formula (1) are predetermined coefficients. Moreover, Lpw in Formula (2) to Formula (4) is a low-pass filter around the pixel to be noted, and the low-pass filter has a characteristic shown in FIG. 6. Moreover, fg in Formula (2) to Formula (4) corresponds to the above mentioned parameter fg.

At Step S12, the controlling part 17 records the image data subjected to the gradation compression processing at Step S11, or the image data subjected to the gradation conversion processing at Step S6, on the memory card 28 through the card interface 25, and completes a series of processing. In addition, before recording the image data on the memory card 28, the controlling part 17 may perform an image compression processing (JPEG compression processing etc.) on the image data through the compression and extension part 26, if necessary.

As described above, in accordance with the present embodiment, the imaging apparatus has a first shooting mode in which correction of the dark area gradation of the image data is not performed and a second shooting mode in which the correction of the dark area gradation is performed, in a selectable manner. When the first shooting mode is selected, the gradation conversion processing is performed according to the first input-output characteristic, and when the second shooting mode is selected, the gradation conversion processing is performed according to the second input-output characteristic which is different from the first input-output characteristic. When the second shooting mode is selected, according to the second input-output characteristic, the gradation conversion processing unit performs correction of improving the lightness of the dark area gradation of an image which is subjected to the gradation conversion processing. Therefore, an optimal gradation conversion processing can be performed as a previous step of performing correction of the dark area gradation.

Moreover, in accordance with the present embodiment, the second input-output characteristic is a characteristic realizing a lower output level than the first input-output characteristic with respect to the same input level in the dark area of gradation. Moreover, in accordance with the present embodiment, the second input-output characteristic is defined by a gradation curve having a gradient smaller than that of the first input-output characteristic in the dark area of gradation. Therefore, since the resultant gradation conversion processing can be suppressed in a relatively dark state, the lightness of the whole image can be maintained before and after the gradation compression process.

Moreover, in accordance with the present embodiment, in the light area of gradation, the second input-output characteristic is a characteristic emphasizing contrast more than the first input-output characteristic. Moreover, in accordance with the present embodiment, in the light area of gradation, the second input-output characteristic is defined by a gradation curve of which gradient is larger than that of the first input-output characteristic. Therefore, it is possible to improve the contrast of the highlight area while suppressing the white washout thereof. Therefore, a preferably drawn image can be generated.

Moreover, in accordance with the present embodiment any one selected from among predetermined plurality of input-output characteristics as the second input-output characteristic, according to the lightness improvement amount of the dark area gradation, a gradation conversion processing is performed according to the selected input-output characteristic, and the dark area gradation of image data is corrected according to the lightness improvement amount. Therefore, an optimal gradation conversion processing depending on the lightness improvement amount of dark area gradation can be performed.

In addition, in accordance with the present embodiment, an example is shown, in which any one selected from among the plurality of gradation curves (gradation curves G1 to G3) shown in FIG. 4 is used, however, a configuration may be used, in which the gradation curve is determined by the controlling part 17 arbitrarily depending on the gradation compression amount. Such a configuration enables an optimal gradation conversion processing according to the gradation compression amount to be performed.

Moreover, in accordance with the present embodiment, although an example is shown, in which the magnitude of the gradation compression amount (lightness improvement amount) can be set into two stages (large/small), a configuration may be used, in which the gradation compression amount is automatically determined by the controlling part 17. For example, a configuration may be used, in which image data is segmented into a plurality of regions, difference in brightness between the maximum brightness region and the minimum brightness region is obtained, and the gradation compression amount is determined depending on the difference in brightness. Moreover, a configuration may be used, in which the gradation compression amount is determined depending on the contrast of the light area.

Moreover, in the present embodiment, although an example is shown, in which the gradation curve used for the gradation conversion processing is adjusted depending on the gradation compression amount, a configuration may be used, in which the influence by exposure compensation is considered. For example, when the lightness of the whole image can be maintained to some extent by way of exposure compensation, the changing amount of the gradation curve used at the time of gradation compression may be set relatively small.

Moreover, in the present embodiment, as described in FIG. 4, although an example is shown, in which characteristics of both of the light area and the black area of gradation curves (G2 and G3) at the time of gradation compression are changed with respect to the gradation curve (G1) at the time of non-compression, a configuration may be used, in which only one of the both characteristics is changed. For example, a configuration may be used, in which the gradient is smaller than that of the gradation curve G1 only in the dark area of gradation, and a configuration may be used, in which the gradient is larger than that of the gradation curve G1 only in the light area of gradation. Further a configuration may be used, in which gradation curves (the gradation curves G2 and G3) at the time of gradation compression processing are changed depending on photographic modes, such as, for example, a "portrait mode" and a "landscape mode", a configuration may be used, in which the gradation curves are changed depending on the strength of the contrast of an image, or a configuration may be used, in which the gradation curves are changed depending on the adjusting mode of the image.

Moreover, in the above-mentioned embodiment, an example is described, in which the technology of the present invention is realized in an electronic camera. However, the present invention is not limited to this. For example, the present invention can also be applied to a camera, such as a compact type electronic camera or a movie camera shooting a moving image, in a similar manner.

Moreover, the image processing apparatus described in the present embodiment may be realized in terms of software by a computer and an image processing program. In this case, a configuration may be used, in which a part or whole of the procedures after Step S4 described in the flowchart in FIG. 3 is realized by the computer. In order to realize the image processing apparatus by the computer, together with the image data, information such as information whether the mode is in a gradation compression mode or not, or information indicating the gradation compression amount should be supplied to the computer. Such information can be supplied to the computer by utilizing EXIF information etc. on image data. Such a configuration enables the same procedures as those of the present invention to be performed.

In addition, the present invention can be performed in various other forms, without departing from the spirit or the main features thereof. Therefore, at all points, the above-mentioned embodiment example is only mere illustration, and should not be interpreted restrictively. The scope of the present invention is indicated by the appended claims, and not restricted by the description of the specification at all. Further, modifications and changes belonging to the scope equivalent to the scope of the claims, are all falling within the scope of the present invention.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging apparatus, comprising:
an image pickup unit picking up a subject image and generating image data;
an operating unit accepting, from a user, an operation of selecting, before the image pickup unit picks up the subject image, any one of (i) a first photographic mode that does not perform a gradation compression processing of improving lightness of a dark area gradation of said image data and (ii) a second photographic mode that performs the gradation compression processing of improving lightness of the dark area gradation of said image data;
a gradation conversion processing unit performing a gradation conversion processing according to a first input-output characteristic on the image data generated by the image pickup unit in the first photographic mode when said first photographic mode is selected, and performing the gradation conversion processing according to a second input-output characteristic different from said first input-output characteristic on the image data generated by the image pickup unit in the second photographic mode when said second photographic mode is selected;
a low-pass processing unit generating a low-pass image by applying a low-pass filter on image data being gradation converted by said gradation conversion processing unit; and
a gradation compression processing unit performing the gradation compression processing of improving lightness of the dark area gradation on the image data subjected to the gradation conversion processing according to said second input-output characteristic by said gradation conversion processing unit using said low-pass image generated by said low-pass processing unit when said second photographic mode is selected.

2. The imaging apparatus according to claim 1, wherein
in a dark area of gradation, said second input-output characteristic is a characteristic realizing a lower output level than the output level of said first input-output characteristic, with respect to the same input level.

3. The imaging apparatus according to claim 2, wherein
in the dark area of gradation, said second input-output characteristic is defined by a gradation curve having a gradient smaller than that of said first input-output characteristic.

4. The imaging apparatus according to claim 1, wherein
in a light area of gradation, said second input-output characteristic is a characteristic emphasizing contrast more than said first input-output characteristic.

5. The imaging apparatus according to claim 4, wherein
in the light area of gradation, said second input-output characteristic is defined by a gradation curve having a gradient larger than that of said first input-output characteristic.

6. The imaging apparatus according to claim 1, further comprising:
an obtaining unit obtaining a lightness improvement amount of the dark area gradation by said gradation compression processing unit; wherein
said gradation conversion processing unit selects any characteristic from among a plurality of predetermined input-output characteristics as said second input-output characteristic according to said lightness improvement amount, and performs said gradation conversion processing according to the selected input-output characteristic; and
said gradation compression processing unit performs the gradation compression processing of improving the lightness of the dark area gradation of said image data according to said lightness improvement amount.

7. The imaging apparatus according to claim 1, further comprising:
an obtaining unit obtaining a lightness improvement amount of the dark area gradation by said gradation compression processing unit; wherein
said gradation conversion processing unit determines said second input-output characteristic according to said lightness improvement amount, and performs said gradation conversion processing according to the determined input-output characteristic; and
said gradation compression processing unit performs the gradation compression processing of improving the lightness of the dark area gradation of said image data according to said lightness improvement amount.

8. The imaging apparatus according to claim 1, wherein:
the operating unit accepts the selection of one of said first photographic mode and said second photographic mode by operation by the user of an operating member.

9. A non-transitory computer readable medium storing an image processing program that causes a computer to perform an image processing with respect to image data to be processed, the image processing comprising the operations of:
obtaining said image data and, before said image data is generated, obtaining from a user a selection between (i) a first photographic mode that does not perform a gradation compression processing of improving lightness of a dark area gradation of said image data and (ii) a second photographic mode that performs the gradation compression processing of improving lightness of the dark area gradation of said image data;
performing a gradation conversion processing according to a first input-output characteristic on the image data generated in the first photographic mode when said image data is generated in said first photographic mode, and performing the gradation conversion processing according to a second input-output characteristic different from said first input-output characteristic on the image data generated in the second photographic mode when said image data is generated in said second photographic mode;
generating a low-pass image by applying a low-pass filter on image data being gradation converted by said gradation conversion processing operation; and
performing gradation compression processing of improving lightness of the dark area gradation on the image data subjected to a gradation conversion processing according to said second input-output characteristic at said gradation conversion processing operation using said low-pass image generated by said low-pass image generating operation, when said image data is generated in said second photographic mode.

10. The non-transitory computer readable medium storing the image processing program according to claim 9, wherein
in the dark area of gradation, said second input-output characteristic is a characteristic realizing a lower output level than the output level of said first input-output characteristic, with respect to the same input level.

11. The non-transitory computer readable medium storing the image processing program according to claim 10, wherein
in the dark area of gradation, said second input-output characteristic is defined by a gradation curve having a gradient smaller than that of said first input-output characteristic.

12. The non-transitory computer readable medium storing the image processing program according to claim 9, wherein in a light area of gradation, said second input-output characteristic is a characteristic emphasizing contrast more than said first input-output characteristic.

13. The non-transitory computer readable medium storing the image processing program according to claim 12, wherein in the light area of gradation, said second input-output characteristic is defined by a gradation curve having a gradient larger than that of said first input-output characteristic.

14. A non-transitory computer readable medium storing the image processing program according to claim 9, wherein:
- at said obtaining operation, a lightness improvement amount of the dark area gradation at said gradation compression processing operation is further obtained;
- at said gradation conversion processing operation, any input-output characteristic from among a plurality of predetermined input-output characteristics is selected as said second input-output characteristic according to said lightness improvement amount, and said gradation conversion processing is performed according to the selected input-output characteristic; and
- at said gradation compression processing operation, the gradation compression processing of improving the lightness of the dark area gradation of said image data is performed according to said lightness improvement amount.

15. A non-transitory computer readable medium storing the image processing program according to claim 9, wherein:
- at said obtaining operation, a lightness improvement amount of the dark area gradation at said gradation compression processing operation is further obtained;
- at said gradation conversion processing operation, said second input-output characteristic is determined according to said lightness improvement amount, and said gradation conversion processing is performed according to the determined input-output characteristic; and
- at said gradation compression processing operation, the gradation compression processing of improving the lightness of the dark area gradation of said image data is performed according to said lightness improvement amount.

* * * * *